United States Patent
Köhler et al.

(10) Patent No.: US 6,341,059 B1
(45) Date of Patent: Jan. 22, 2002

(54) HOLDING DEVICE FOR COMPUTER MEMORY DRIVE CARRIERS

(75) Inventors: Friedrich Köhler, Meitingen; Pia Lorenz, Ried, both of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/381,808
(22) PCT Filed: Mar. 23, 1998
(86) PCT No.: PCT/DE98/00848
   § 371 Date: Jan. 3, 2000
   § 102(e) Date: Jan. 3, 2000
(87) PCT Pub. No.: WO98/43246
   PCT Pub. Date: Oct. 1, 1998

(30) Foreign Application Priority Data

Mar. 26, 1997 (DE) ........................ 297 05 507 U

(51) Int. Cl.[7] .................................................. G06F 1/16
(52) U.S. Cl. .................... 361/685; 361/683; 361/684; 361/686; 248/636; 248/637
(58) Field of Search ................... 361/683–686; 248/633, 634, 636, 637, 616; 312/332.1, 333; 360/97.01, 78.01, 137; 369/900, 75.1–79

(56) References Cited

U.S. PATENT DOCUMENTS 5,768,097 A * 6/1998 Jelinger .................. 361/683
6,088,222 A * 7/2000 Schmit et al. ............ 361/686

FOREIGN PATENT DOCUMENTS

DE 40 35 124 5/1992
GB 2 190 793 11/1987

* cited by examiner

Primary Examiner—Gerald Tolin
Assistant Examiner—Yean-Hsi Chang
(74) Attorney, Agent, or Firm—Schiff Hardin & Waite

(57) ABSTRACT

An inwardly directed wall projection that comprises a supporting edge proceeding parallel to the insertion direction and an aperture for a screw to be applied from the outside is provided at one of the two side walls of a cage-like chassis for the acceptance of at least one horizontally introducible drive carrier securable with a screwed connection. Spring elements are provided at the opposite side wall, so that the drive carrier pulled against the wall projection with the screw is secured parallel to the insertion direction free of play and protected against twisting.

7 Claims, 1 Drawing Sheet

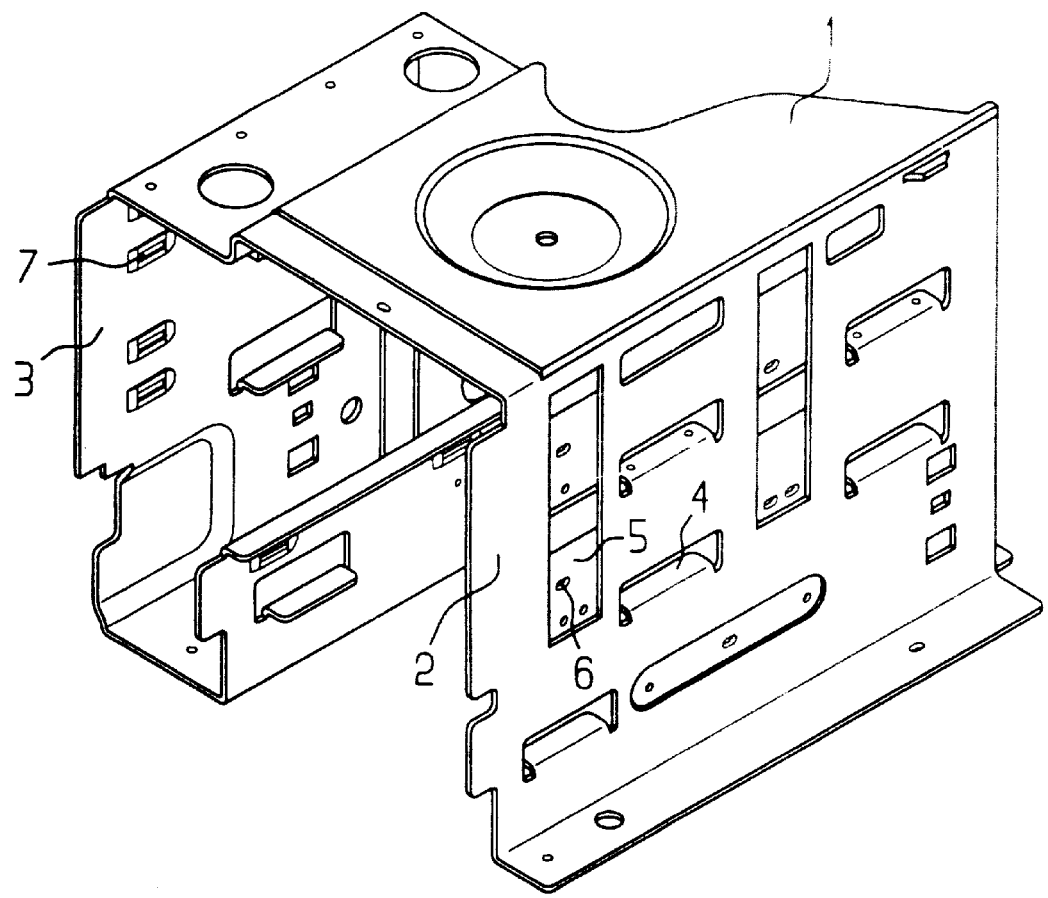
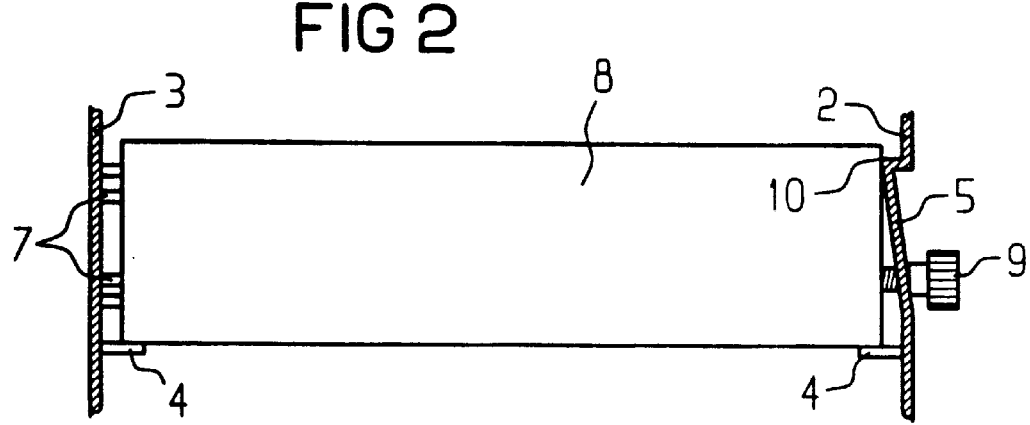

HOLDING DEVICE FOR COMPUTER MEMORY DRIVE CARRIERS

BACKGROUND OF THE INVENTION

The invention is directed to a holding device for computer memory drives which comprises a rectangular, cage-like chassis that has inwardly directed guide elements on opposite side walls for accepting at least one longitudinal introducible drive carrier that can be secured by a screw connection.

Cage-like chassis are often employed for fastening memory drives in computer housings, and these chassis usually have a plurality of installation locations arranged above one another. A respective memory drive carrier can be inserted into each of these installation locations, capable of being screwed fast to the chassis with a plurality of screws that engage in threaded bores provided at the side walls of the drive carriers. The both-sided screwing to the housing in fact assures, on the one hand, that the drive carrier is arranged without play and in largely exact alignment in the chassis; on the other hand, the multiple screwing requires a substantial assembly outlay given installation and de-installation, particularly because one of the two chassis sides is often not very accessible due to the usually extremely tight, compact structure.

SUMMARY OF THE INVENTION

The present invention is therefore based on the object of finding an optimally simply, assembly-friendly solution for fastening memory drive carriers in a cage-like chassis arranged inside a computer housing.

This object is achieved by an improvement in a chassis, which improvement is one of the two side walls has an inwardly directed wall projection at each location, the wall projection including a supporting edge extending parallel to the insertion direction, each wall projection having an aperture in a region of a threaded bore of a lateral surface of the drive carrier to enable a threaded screw to extend through the aperture to engage in the threaded bore, and an opposite wall of the chassis having spring elements to urge the drive carrier against the wall projection without play and to prevent twisting. The advantage of the inventive holding device is that the drive carrier can be secured play-free from one side with a single screw and exactly aligned with reference to the insertion direction.

An exemplary embodiment of the invention is explained in greater detail below with reference to the drawings.

BRIEF DESCRIPTION OF THE DRAWINGS

FIG. 1 is a perspective view of a cage-like chassis for the acceptance of memory drive carrier; and FIG. 2 is a schematic sectional view of the fastening of the memory drive carrier in an arrangement according to FIG. 1.

DESCRIPTION OF THE PREFERRED EMBODIMENT

FIG. 1 shows a cage-like chassis 1 for the acceptance of at least two memory drive carriers arranged one above the other. A plurality of strip-like guide clips 4 are punched free and bent inward at a right angle at those side walls 2, 3 of the chassis residing opposite one another. They serve as seating for the memory drive carriers insertable between the two side walls 2, 3 of the chassis. For secure seating over the entire length of the memory drive carriers, respectively two guide clips 4 are provided per installation location at each side wall 2,3. Respective, inwardly directed wall projections 5 are provided on one of the two side walls, for example at the right-hand side wall 2, and are laterally offset relative to the guide clips 4. These wall projections 5 are fashioned as obliquely inwardly inclined, largely planar surfaces in the illustrated exemplary embodiment. These wall projections 5 are respectively arranged in the region of the threaded bores provided at the lateral surfaces of the drive carriers. The wall projections 5 therefore respectively comprise a recess, opening, or aparture 6 for a screw to be attached from the outside. The function of these wall projections 5 is explained in yet greater detail in conjunction with the description of FIG. 2. One or more spring elements 7 are provided at the inside of the other side wall 3, and the spring elements 7 are preferably formed of the sheet metal material of the side wall 3 in a punching and coining process. A drive carrier plugged into the respective installation location is thus held free of play by, on the one hand, the spring element 7 and by, on the other hand, the wall projections 5.

The function of the holding device is shown in the schematic sectional view of FIG. 2. This FIG. 2 respectively shows a section of the side walls 2, 3 of the chassis 1 shown in FIG. 1 in the region of an installation location for a memory drive carrier 8. The memory drive carrier 8 insertable between the two side walls 2, 3 thereby lies on the inwardly bent guide clips 4 at the side walls 2, 3. The fastening ensues via a single screw 9 engaging in the region of a wall projection 5 that can be screwed into a threaded bore in the lateral surface of the drive carrier 8. The drive carrier 8 is thereby pulled in and aligned at the supporting edge 10 of the wall projection 5 that proceeds parallel to the insertion direction. What the spring elements 7 provided at the side wall 3 effect, on the one hand, is that the drive carrier is held without play between the spring elements 7 and the wall projection 5 and, on the other hand, they prevent an undesired twisting of the drive carrier 8 from the horizontal attitude when tightening the screw 9. The wall projection 5 is formed of the material of the side wall 2 in a coining process. As shown, it can be composed of an obliquely inwardly inclined, essentially planar surface whose upper limitation serves as a supporting edge 10. The wall projection, however, can also be fashioned at least as a partially arced supporting surface.

We claim:

1. A holding device for computer memory drives, said device comprising a rectangular, cage-like chassis having opposite side walls with inwardly directed guide elements for the acceptance of at least one horizontally introducible drive carrier that can be secured with a screw connection, one of the two side walls having at least one inwardly directed wall projection for every installation location, said wall projection having a supporting edge extending parallel to the insertion direction, the wall projection having an aperture in the region of a threaded bore of a lateral surface of the drive carrier being supported on the wall projection, said aperture receiving a screw applied from the outside to a threaded bore of the drive carrier and the other of the two walls having a spring element provided opposite the one side wall so that the drive carrier pulled against the wall projection with the screw is secured parallel to the insertion direction without play and protected against twisting.

2. Holding device according to claim 1, wherein the wall projection is fashioned as an obliquely inwardly inclined, largely planar surface whose upper limitation serves as supporting edge.

3. Holding device according to claim 2, wherein the wall projection is fashioned as rectangular surface.

4. A holding device according to claim 1, wherein the wall projection is formed by a coining process.

5. A holding device according to claim 1, wherein the wall projection has a thickness substantially the same as the thickness of the one side wall and being pressed inwardly from said one side wall.

6. A holding device for computer memory drives, said device comprising a rectangular, cage-like metal chassis having opposite side walls connected by a transverse wall, each side wall having portions bent inward to form inwardly directed guide elements for the acceptance of at least one horizontally introducible drive carrier, one of the two side walls having at least one inwardly directed wall projection for every installation location, said wall projection having a supporting edge extending parallel to the insertion direction, the wall projection having an aperture in the region of a threaded bore of a lateral surface of the drive carrier being supported on the wall projection, said aperture receiving a screw applied from the outside to a threaded bore of the drive carrier and the other of the two walls having a portion forming a spring element opposite each wall projection of the one side wall so that the drive carrier pulled against the wall projection with the screw is secured parallel to the insertion direction without play and protected against twisting.

7. A holding device according to claim 6, wherein each wall projection is a largely planar surface extending obliquely to a plane of the side wall with a step adjacent an upper limitation of the planar surface to form the supporting edge.

* * * * *